Sept. 28, 1954

E. W. KLEINPETER 2,690,374

RECORDING APPARATUS

Filed Jan. 29, 1952

INVENTOR:
EDWARD W. KLEINPETER
BY Kenneth Swartwood
ATTORNEY

Patented Sept. 28, 1954

2,690,374

UNITED STATES PATENT OFFICE 2,690,374

RECORDING APPARATUS

Edward W. Kleinpeter, Baton Rouge, La., assignor to Ethyl Corporation, New York, N. Y., a corporation of Delaware Application January 29, 1952, Serial No. 268,707

3 Claims. (Cl. 346—62)

This invention relates to apparatus for recording temperatures, voltages, or other physical variables. More particularly, the invention relates to a unitary apparatus for recording such data obtained from a multiplicity of points.

In numerous industrial operations, it is necessary to closely observe the operating conditions of a large number of equivalent production units. For example, when reaction conditions, such as operating pressures or other requirements, are rigorous, the process is frequently carried out in a series of equivalent or identical reactors. Numerous additional examples of such situations are found in the electrochemical or electro-metallurgical fields. Thus, electrochemical plants usually employ a large number of identical cells connected in electrical series. To assure efficient operation of such a cell line, it is necessary that the resistance of each cell, and hence the individual voltage drops encountered, should be maintained within relatively narrow operating limits. Almost invariably, it is desired that a record of the operating voltage of the cell be available, so that the current performance history of the cell is available for study, to allow intelligent adjustment of conditions. In addition to the voltage drop encountered in such cells, individual temperature measurements are also highly desirable.

Inasmuch as usual commercial installations normally contain from 50 to 100 cells in a single circuit, it is apparent that a large amount of continuing data is required for opitmum operation of a plant. Heretofore, such data has not been conveniently or economically obtainable owing to limitations in capacity of commercially available equipment. Present instruments do not provide for obtaining a record of the data from more than about five or six points. Further, commercial instruments do not provide for segregation of different sets of data. In other words, instead of the points representing data from different units being clearly segregated, conventional instruments plot all the data on the same chart. Therefore, the performance of a specific unit is difficult to follow because every related point must be picked out and distinguished from intervening points representing data from other units.

A major object of the present invention is to provide a unitary recording apparatus for receiving and recording data from a multiplicity of points. A further object is to provide apparatus which concurrently segregates the data according to source, that is, which plots the data from each unit as a discrete record. Another object is to provide apparatus which, in addition to segregatng the data according to groups or plots according to source, also provides relative disposition of the separate plots in a manner allowing ready comparison or contrast of the several plots one with the other.

The foregoing and additional objects are fully attained by the present invention. The apparatus and mode of operation will be more fully understood from the following description and the accompanying figures, wherein.

According to the present invention a recording apparatus of the above type includes a series of record portions, a holder carrying said record portions in an endless pattern, marking mechanism located adjacent a part of this pattern for applying marks to the record portion at this position, scanning mechanism connected to move the holder with respect to the marking mechanism and advance the series of record portions successively to said marking position, and commutator elements including a plurality of separate connectors for connection to separate apparatus units to carry signals supplied by said units and also including switch means connected to the marking mechanism to cause it to shift the marking in accordance with the supplied signals, the commutator elements being connected to move along with said holder to connect the switch means to the successive connectors in synchronism with the bringing of successive record portions into the marking position The amount by which any mark is shifted is indicative of the signals supplied by the separate apparatus units, and will accordingly indicate their individual operating characteristics. By having the record portions of elongated form, the marking mechanism can be arranged to move transversely of the record portion lengths and apply additional sets of marks on longitudinally-spaced portions each time the holders move through the predetermined pattern position. More than one marking mechanism can be used with the same record holder, to apply separate marks which may be distinguished either by color or shape of the marks themselves or by confining the respective marks to different sections of the record portions. Electric signals are preferred forms of signals transmitted from the apparatus units to the marking mechanism.

Figure 1:
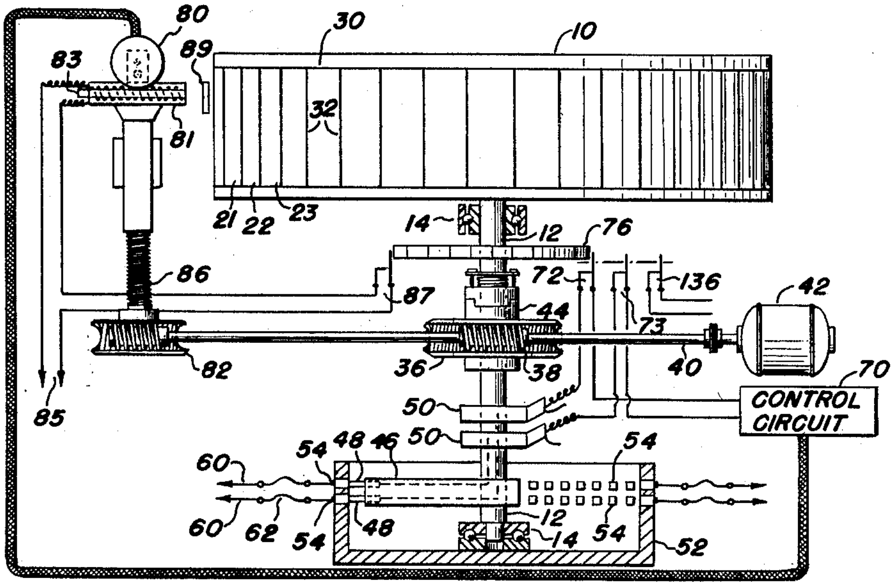
Figure 1 is a simplified front elevation of the essential elements of a recording apparatus according to the present invention.
Figures 2, 3:
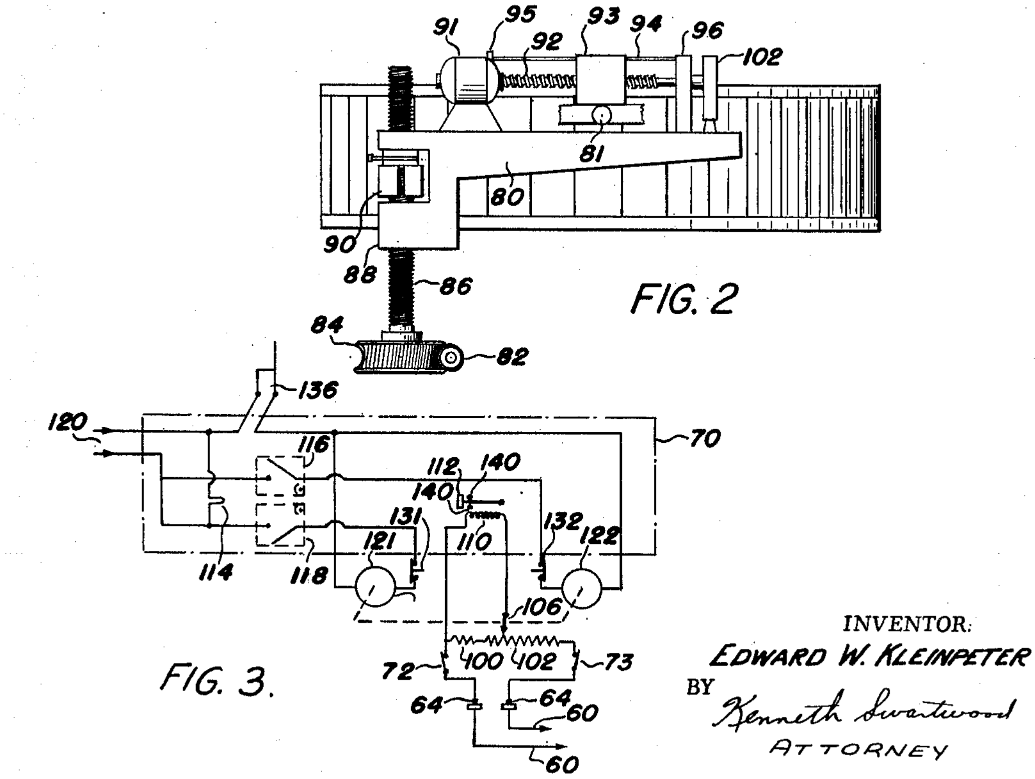
Figure 2 is a side view of a portion of the apparatus of Figure 1 showing additional details of this construction.
Figure 3 is a schematic drawing showing a circuit diagram for the operation of the apparatus of Figures 1 and 2.

Referring now to the apparatus of Figures 1, 2 and 3, there is here shown a record holder in the form of a drum 10 carried by a shaft 12 journalled for rotation as by means of bearings 14. The drum is arranged to carry an assembly of record units or portions 21, 22, 23, etc., shown in the form of a continuous loop or band 30 encircling the cylindrical drum periphery where it can be cemented or held in place by any convenient arrangement. The individual units or portions 21, 22, 23, etc., can be suitably differentiated from each other as by markings shown for example by the lines 32, and if desired the drum periphery can be of polygonal form providing a perfectly flat surface portion for each individual record portion.

The drum-carrying shaft 12 is arranged to be slowly rotated as by means of the worm gear 36 which engages a worm 38 held on a drive shaft 40 which is in turn rotated by driving motor 42. For greater adjustability, arrangement can be made for disengaging the worm gear 36 from the drum-carrying shaft 12, as by means of clutch 44.

Shaft 12 also carries commutator elements shown as including a radial arm 46 fixed to the shaft and provided at its outer end with outwardly biased commutator brushes 48, connected to respective commutator rings 50. Cooperating with brushes 48, there is shown a fixed commutator shell 52 in which are positioned sets of commutator contact bars 54. The bars are connected as by leads shown at 60, which may be fused as indicated at 62, to the separate apparatus units whose operating characteristics are to be recorded.

An additional set of brushes 64, establish electrical connection between the commutator rings 50 and a control circuit 70 by way of isolating switches 72, 73. These switches are normally held in closed position as by a suitable bias, and are ganged together for simultaneous opening by a multi-toothed cam 76 carried by shaft 12. The number of teeth on this cam corresponding to the number of sets of commutator bars 54 in shell 52, and the record member 30 is also subdivided into an equal number of marking portions 21, 22, 23, etc.

The apparatus described above also includes a marking mechanism indicated generally at 80 and driven in synchronism with drum 10 as by providing drive shaft 40 with an additional worm 82 arranged to mesh with a second worm gear 84 suitably supported and fixed to a threaded rod 86. A vertically movable platform 88 is fitted over rod 86 and a split nut 90 is held by the platform 88 in threaded engagement with rod 86 so that the platform is raised or lowered as the drive shaft 40 is rotated. The split nut 90 can be arranged for disengagement when desired to permit adjustment of the platform height. Additional guide elements (not shown) can be provided to hold the platform properly aligned with respect to the drum and the threaded rod 86.

Platform 88 also carries a reversible electric motor 91 fitted with a threaded shaft 92 on which is threadedly engaged a traveling block 93 having a threaded passageway in which shaft 92 is received. The block 93 also has another passageway within which is fitted a guide rod 94 held between supports 95, 96 and acting as an aligning guide for the block to keep it in its proper orientation. Rotation of motor 91 turns shaft 92, and block 93 which is kept from rotation by guide 94 is accordingly caused to move along the shaft 92. Depending from block 93 is a printing unit shown as including a solenoid 81 having a plunger 83 which is normally held retracted in the position shown in Figure 1 as by an internally fitted spring. This solenoid is connected for energization from a suitable source of electric power as by means of conductors 85 via a switch 87 which is normally biased in open position, but is momentarily closed by the toothed cam 76. Between the printing unit 81 and the adjacent record portion, there is held a printing member 89 which can conveniently be a typewriter ribbon or the like.

The printing mechanism of the above apparatus is conveniently operated with the simple control circuit shown in Figure 3. This circuit includes a potentiometer type network having a fixed resistor 100 and a slide resistor 102 connected in series across the ring brushes 64. Between the remote end of the fixed resistor 100 and the movable potentiometer contact 106 there is connected a voltmeter 110 provided with a small mirror 112 which is arranged to be tilted in response to the voltage impressed on the voltmeter. The fixed resistor 100 and the total resistance of the potentiometer 102 are selected so that the range of fractions of the voltage in line 60 delivered by the potentiometer will be about the limits of the range of marking mechanism operation. A source of light 114 and two photoelectric relays 116, 118 are positioned to cooperate with mirror 112 so that at about the midpoint of the normal voltage range, light from source 114 is reflected by mirror 112 and falls midway between these relays, without energizing either one. However, a variation in voltage on one side or the other from the midpoint will cause the mirror 112 to shift its reflected beam on one or the other of the relays.

Light 114 can be energized from a suitable source by way of conductors 120 which are also connected through these relays to two different windings 121, 122 of motor 91 which has these windings arranged so that they will separately energize the motor to rotate in opposite directions. The movable potentiometer contact 106 is also connected with motor shaft 92 so that motor rotation will cause the contact to sweep along the potentiometer as the block 93 moves. To avoid difficulties, limit switches 131, 132 are connected in the winding energizing circuit for automatically opening whenever the block 93 is carried to the desired limits along shaft 92.

The apparatus of Figures 1, 2 and 3 has been found to be effective for recording the operating characteristics of a series of fused salt electrolysis cells. Such cells electrolyze fused salts in any suitable or well-known manner, and are generally operated in a series string across a high voltage direct current electric circuit. As many as 70 or 80 or more such cells may be in one string. The leads 60 can be connected to the respective cells, with the voltmeter circuit arranged to occupy its neutral position when about 7 volts appear across these leads.

As each record portion 21, 22, 23, etc., is brought in place opposite the marking mechanism, the brushes 48 are moved into engagement with an individual set of commutator bars 54. At the same time switches 72, 73 are opened during the interval when brushes 48 are connected between these bars and the previous set of bars. This prevents the short circuiting of any of the series-connected cells with which the recorder is operating. In addition, a further switch 136 can also be connected for simultaneously opening the marking motor energizing circuit to keep the motor from unnecessarily moving toward the zero voltage position while the switches 72, 73 are open.

When the brushes 48 have completed their span and are now engaging only a single set of commutator lugs, the switches 72, 73 are again closed, thereby applying voltage to the voltmeter 110. If the voltmeter indicates that this voltage is too low, mirror 112 will be tilted down for example as seen in Figure 3, causing the light from source 114 to reflect on relay 118. This energizes motor winding 121 which is connected to cause the shaft 92 to rotate in the direction that carries the potentiometer arm 106 towards the outer end of the potentiometer thereby increasing the voltage at voltmeter 110. When the potentiometer delivers a potential at the neutral value of 7 volts, the mirror 112 returns to neutral, deenergizing relay 118, stopping the motor rotation. The block 93 is thereby shifted to a definite position in its range of travel where it will remain unless the connected cell undergoes a voltage change in which case the block will move correspondingly.

The same operation takes place in the opposite direction when the incoming voltage at leads 60 is too high. In this event the mirror tilts up, activating relay 116 and causing the block 93 to carry the potentiometer arm 106 in the direction of lower voltage outputs. As shown in Figure 3, the mirror 112 may be provided with stops 140 to limit its maximum tilt to an amount that keeps the reflected beams from moving beyond the relays. The mirror can also be damped to reduce hunting by motor 91.

By making the marking mechanism vertically movable, as indicated in Figures 1 and 2, the recorder is arranged to apply another mark each time a record portion is moved into marking position. The record portions are preferably elongated so that the successive marks can be displaced longitudinally of the record portion to give a record that can be extended for any convenient number of drum cycles. However, if desired the marking mechanism can be fixed so that all marks are applied at only one level and the apparatus reset either with a new record member or at a different level of the old record member after each drum cycle.

As an illustration of the operation of the above-described recording mechanism, the record member-carrying drum can be arranged to rotate at a convenient speed of six revolutions per hour, with the marking platform moved vertically about $\frac{1}{12}$ inch or less with each drum revolution. In this way a record portion having a height of about 12 inches can be used to record an entire 24 hour operation shift of all the individual equipment units, with a record mark for each 10 minutes of operation.

Instead of moving the record holder and keeping the marking mechanism 80 stationary, the record holder can be kept stationary and the marking record moved around it. If desired the record holder can be made in the form of a shell with the marking mechanism placed in the center of the record holder, the record member being fastened to the inside surface of the holder. The drive disengagement for the motion of the record member with respect to the marking mechanism can also be conveniently provided by having the driving motor and drive shaft 40 with its worms 38, 82 shiftable away from either or both of the corresponding worm gears 36, 84 as by suspending the drive shaft and motor from a pivot axis parallel to the shaft.

More than one marking mechanism can be used where different operating characteristics are to be recorded on the same record member. By way of example, temperature readings can also be recorded by providing a second printing assembly on platform 88 or on a separately actuated platform, connected by means of a separate control circuit and an independent commutating or selecting arrangement, with leads supplying the voltage outputs of thermocouples suitably provided in the individual equipment units. To distinguish the marks of the separate marking mechanism they can be provided with printing members 89 of different colors, such as red and black, or the marking surfaces of the respective solenoids 83 can be shaped to provide impressions of different and readily distinguishable configurations such as a circle and line. The marking mechanisms can be mounted alongside each other so that both apply marks to the same record portion at about the same time, or they can be separated along the record member to apply marks at different sections of the record on the same or different record unit portions. Additional marking mechanisms can be used to record other operating characteristics. With temperature or other types of recording where the short circuiting of series-connected units is not a problem, the switches 72, 73 are not needed and can be replaced by direct connections. In installations where short circuit prevention is desired, this can also be provided by separate switches in all the individual leads 60, such switches being opened by a cam such as cam 76 each time the commutator selection changes. Where suitable, the commutator arrangement can be further simplified by connecting one lead of every pair 60 as a common grounded or ungrounded connection running directly to a lead 64 so that the number of commutator bars and brushes are diminished.

The printing member 89 can, if desired, be in the form of a regular marking pen provided with its own supply of link as in conventional recorders. Other modifications that can be made include the substitution of a Wheatstone or balancing bridge with a galvanometer used instead of a voltmeter 110. Amplification stages, such as electron discharge tube amplification circuits can also be used to intensify the signal supplied to the voltmeter or galvanometer, or to further amplify the current delivered by the relays 116, 118, or to replace these relays. In addition, the motor 91 can be provided with a single reversing winding, the connection of which is switched in polarity with respect to the remainder of the motor, as for example the armature windings, in order to reverse its direction. With this type of construction, relays 116, 118 are connected to shift the polarity of the reversing winding. A three-position switch having one neutral position can also be used for this purpose.

According to a further modification of the present invention, the motor 91 along with its shaft 92 can be completely eliminated and replaced by a pair of solenoids, each acting on a common armature and connected to pull the armature in opposite directions in accordance with the output of the respective relays 116, 118. Instead of two solenoids, a single polarized solenoid can be used with relays supplying oppositely polarized currents. A dash pot or similar damping arrangement is advantageously used to damp out inertia effects in the relay armature, and a brake mechanism can also be provided to hold the armature in any position to which it is moved by a solenoid, after the solenoid energization is terminated.

Instead of requiring electrical signals for actuating the recorder shifting to indicate the operating condition to be recorded, fluid or mechanical signals can be so used. Thus each equipment unit being monitored can have a hydraulic or pneumatic tube linking it with a Bourdon tube or the like to change the position of the tube in accordance with desired operating conditions such as temperature or pressure. By providing a measuring unit such as a piezo electric generator or photoelectric relay and mirror assembly for the Bourdon tubes to cooperate with, the marking mechanism can be controlled and by introducing a potential reducer for the piezo electric generator, or a light source shifter for the mirror, will automatically find the proper balance position.

As many apparently widely different embodiments of this invention may be made without departing from the spirit and scope hereof, it is to be understood that this invention is not limited to the specific embodiments hereof, except as defined in the appended claims.

What is claimed is:

1. Apparatus for plotting physical data from a multiplicity of sources comprising an endless series of identical record portions, a holder carrying said record portions, said holder being movably mounted on a support for movement to regularly advance the series in a predefined pattern, marking mechanism located adjacent said holder for applying marks to the said record portions, said marking mechanism being movable in one direction substantially parallel to the surface of the record portion adjacent thereto, means for so moving said marking mechanism in synchronization with the movement of said holder and the record portions, the marking mechanism including plotting means shiftable within limits for plotting a data point on the record portions, and shifting means for shifting the said plotting means of the marking mechanism in a direction at a substantial angle to the direction in which said marking means is movable but also substantially parallel to the record portion adjacent thereto, said shifting means being responsive to signals proportional to the data, and commutator means for supplying said signals from the data sources to said shifting means, and switch means synchronized with said holder for actuating the said plotting means at time intervals at which the record portions are at a predetermined position with respect to said marking mechanism.

2. The apparatus of claim 1 further defined in that the holder is a continuously rotating drum and the plotting means provides a point on said record portions in a time virtually instantaneous with respect to the rotation of said drum.

3. The apparatus of claim 2 further defined in that the drum has a diameter which is large in proportion to the dimensions of a record portion which coincides with an arc of the drum whereby uniform divisions of a straight line tangent to the record portion, if projected to the drum, provide substantially uniform divisions of the said arc, and the marking mechanism is movable in a straight line paralleling said straight line tangent.

References Cited in the file of this patent

UNITED STATES PATENTS

| Number | Name | Date |
|---|---|---|
| 1,114,348 | Flynn | Oct. 20, 1914 |
| 2,118,081 | Grisdale | May 24, 1938 |
| 2,171,327 | Anderson | Aug. 29, 1939 |
| 2,243,456 | Dutter | May 27, 1941 |